March 14, 1961 L. B. STALLARD 2,975,406

MATRIX MEMORY

Filed Nov. 27, 1959 4 Sheets-Sheet 1

INVENTOR
LANGDON B. STALLARD

BY Roger S. Smith

ATTORNEY

March 14, 1961 L. B. STALLARD 2,975,406

MATRIX MEMORY

Filed Nov. 27, 1959 4 Sheets-Sheet 3

March 14, 1961 L. B. STALLARD 2,975,406

MATRIX MEMORY

Filed Nov. 27, 1959 4 Sheets-Sheet 4

United States Patent Office 2,975,406

Patented Mar. 14, 1961

2,975,406

MATRIX MEMORY

Langdon B. Stallard, Wappingers Falls, N.Y., assignor to International Business Machines Corporation, New York, N.Y., a corporation of New York Filed Nov. 27, 1959, Ser. No. 855,801

15 Claims. (Cl. 340—174)

The present invention relates generally to information storage systems, and is directed in particular to improvements in storage or memory systems of the type which employ bistable element matrices.

Memory systems employing bistable element matrices are known in the data processing arts. While several different bistable elements have been used, magnetic cores have enjoyed the widest usage in commercial equipment. In view of this, the present invention is herein disclosed as applied to a memory system employing magnetic core matrices.

A conventional magnetic core matrix comprises a plurality of bistable magnetic cores arranged in a coordinate array, for example, in rows and columns. A plurality of separate coordinate excitation means, in the form of row and column coils, or windings, are inductively coupled to the cores along the rows and columns of the matrix so that each core is individually identifiable in terms of a specific combination of one row winding and one column winding. The row and column windings are arranged so that energization of one winding, alone, is insufficient to switch the magnetic cores coupled thereto from one magnetic remanence state to the other, but so that the additive magnetic effects of two energized windings upon a core will effect a change of state thereof. With this arrangement, it is possible to individually alter the state of any selected core in the matrix by coincidently energizing the single row winding and single column winding common to that core.

Binary information may be written into a core in a matrix by driving the core to the one of its two states which represents the binary value to be stored. The information thus stored may be read out of the core by driving the core to a predetermined one of its states and sensing whether a change of state occurs. The sensing is accomplished by a sense winding coupled to the core wherein a voltage is induced if a change of state takes place.

Conventional magnetic core storage systems generally employ a plurality of matrices for storing binary or binary coded data in three dimensions. The matrices are arranged in a plurality of parallel planes, and corresponding row and column windings in each plane are connected in series circuit arrangements so that coincident energization of one row circuit and one column circuit activates a similarly located core in each plane of the three dimensional array. The several cores common to a given combination of row and column circuits comprise a word storage register wherein a multi-bit data word may be stored. Each plane of the array corresponds to one bit position in each register and a separate bit value control winding, commonly known as an "inhibit" winding, is provided for each plane. The winding, and a bit sense winding as well, are coupled to all of the cores in the corresponding plane.

A data word is written into a selector register position in the array by energizing the row and column circuits corresponding to that register position in a direction to drive all of the associated cores to the binary one state, and coincidently energizing the inhibit windings of those planes wherein it is desired to write a binary zero. The inhibit windings carry current of the same amplitude as a row or column winding but always in a direction to drive the associated cores toward the binary zero state. Thus, when an inhibit winding of a given plane is energized, it cancels the effect of one of the two energized row and column windings and prevents the addressed core in that plane from being switched to the binary one state, thus effectively writing a binary zero in that core. The data word thus written in the memory may be read out by energizing the same combination of row and column circuits in a direction to drive all cores of the storage register to the binary zero state. Those cores wherein binary ones were stored will experience a flux reversal and will induce voltage pulses in the sense windings of their planes. Cores containing binary zeros will not be switched and no signals will appear on the sense windings of their planes. The inhibit windings are not employed during a read operation.

Proper operation of a memory of the type just described depends upon the ability of the storage elements in each matrix to distinguish between excitation of what may be termed "half select" amplitude developed by a single coordinate excitation means and excitation of "full select" amplitude developed by coincident energization of two coordinate excitation means. A critical value of excitation which will cause a core to be switched lies between half and full select excitations. If for any reason the excitation of an unselected element exceeds the critical value, then unselected storage elements will be wholly or partially driven to states opposite to those in which they should remain and the information stored will be altered.

In memory systems of the type described, unwanted alterations of non-selected elements during reading and writing operations has been a major source of operational difficulty. While such alterations may be caused by several factors, for example, improper calibration or control of half select excitation magnitude, a primary cause is the presence of spurious signals in non-energized coordinate excitation means induced therein by neighboring coordinate excitation means. In a conventional three dimensional memory array, the corresponding coordinate excitation means in each plane are connected in common circuits. Thus, for example, the row windings for the first row of cores in each plane are connected in series, the row windings for the second row of cores in each plane are connected in series, etc. Throughout the entire array, the windings for the first row are adjacent the windings for the second row, etc. Upon energization of any row circuit, line-to-line coupling, both inductive and capacitive, exists between the energized circuit and the row circuits on each side thereof. In a closely packed memory these couplings may, and frequently do, induce into the non-energized circuits currents of as high as one third the amplitude of the current flowing in the energized circuit. The presence of unwanted currents of this magnitude can cause considerable destruction or alteration of information. Cores at the intersections of the spuriously energized row windings and the selection column winding may be completely switched from one state to another. Cores at the intersections of the spuriously energized lines of both the row and column coordinates may receive as much as two thirds of full select excitation and be partially switched thereby. In either case, information has been destroyed or seriously distorted and machine errors will result.

It is the principal object of the present invention to provide a memory array wherein coupling between coordinate excitation means is significantly reduced.

A further object of the invention is to provide a memory array wherein spacing between storage elements may be reduced without increasing the destructive effects of unwanted couplings between coordinate excitation means.

A still further object of the invention is to reduce the power requirements of a memory by eliminating unnecessary power drains resulting from spurious coupling between excitation means.

These and other objects and advantages of the invention are accomplished by providing a three dimensional memory array wherein the series connected coordinate excitation means of the several planes occupy different positions in each plane in accordance with a predetermined pattern. With this arrangement, no two parallel coordinate excitation circuits are physically close to one another in more than a few of the many planes of the array, and the couplings between them are accordingly reduced and, in fact, practically eliminated.

The arrangement just described permits closer packing of the storage elements and also effects a substantial reduction in wasted power. As will presently appear, a wiring arrangement provided in accordance with the invention also offers certain advantages in speed and ease of construction.

The foregoing and other objects, features and advantages of the invention will be apparent from the following more particular description of preferred embodiments of the invention, as illustrated in the accompanying drawings.

Figure 1:
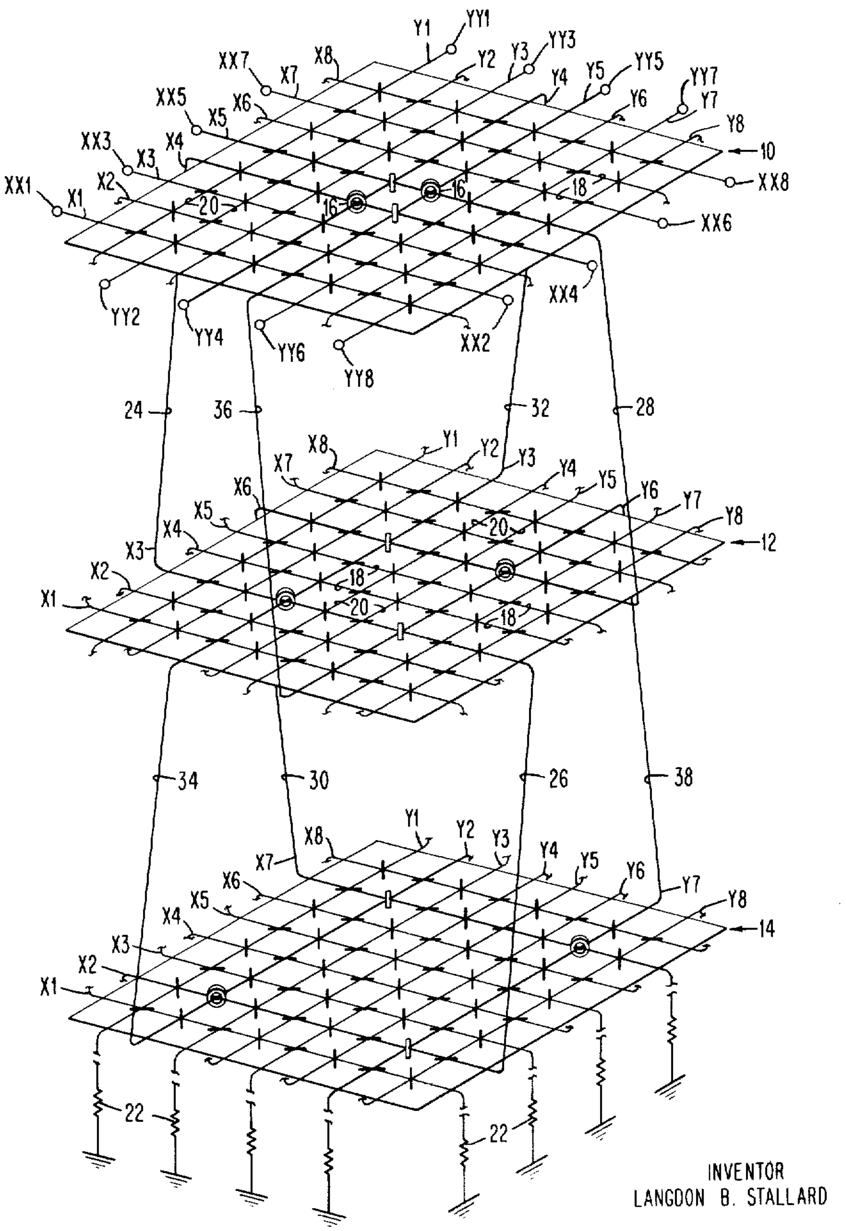
Figure 1 is a diagrammatic illustration of three core planes of a three dimensional memory embodying the present invention.

Referring now to the drawings, there are diagrammatically shown in Figure 1, three memory core planes 10, 12, and 14 which form a part of a three dimensional magnetic core memory of the general type shown and described in the copending application Serial No. 592,545, filed June 20, 1956 by Wayne D. Winger et al., and assigned to the assignee hereof. Each plane 10, 12, and 14 comprises a plurality of magnetic memory cores 16, arranged in a plurality of rows and columns. While the majority of the cores 16 have been illustrated in Figure 1 as short heavy lines, it will be understood that they are, in actuality, three dimensional bodies, for example, toroids. In addition to the cores 16, each plane includes a plurality of row windings 18, numbered X1–X8 and a plurality of column windings 20 numbered Y1–Y8. Each separate row winding 18 is inductively coupled to all of the cores 16 of a different row of the associated matrix and each separate column winding 20 is inductively coupled to all of the cores 16 of a different column of the associated matrix. A coupling is illustrated in Figure 1 merely by intersection of a winding with a core; however, in actuality, the coupling is effected by threading the winding one or more turns through the core.

With the construction described, each separate core in each matrix is individually identifiable in terms of the row winding and column winding which intersect at that core. The state of any selected core may be individually altered by coincidently energizing the row and column windings which intersect at that core with currents of half select amplitude and of polarities which add to create a total magnetic force of sufficient magnitude to drive the core along its hysteresis loop from one remanence state to the other.

In addition to the row and column windings, each plane 10, 12 and 14 also includes an inhibit winding coupled to all of the cores of the plane and a sense winding coupled to all of the cores of the plane. In the interest of clarity, these last two mentioned windings have been omitted in the drawings. Their connections form no part of the present invention. These windings and their functions are clearly described in the copending application Serial No. 592,545, mentioned above.

To form a three dimensional array, each row winding 18 of each plane is connected in a common series circuit with one row winding in each other plane and each column winding in each plane is connected in a common series circuit with one column winding in each other plane. The row and column series circuits, commonly referred to as "address lines" are identified by the reference characters XX1–XX8 and YY1–YY8 in Figure 1. Each said address line is connected at one end, for example, the upper end in Figure 1, to a suitable pulse producing means, or driver (not shown) and at the other end to reference potential through a suitable terminating device such as a resistor 22. By coincident activation of a selected row address line and a selected column address line any desired storage register, comprising one core from each plane, may be activated. In an arrangement such as that shown the drivers must be bipolar, that is to say, capable of producing pulses of either polarity, to provide for writing information into the storage registers and reading it therefrom.

It will be observed in Figure 1 that adjacent cores 16 in each row and column of the planes 10, 12 and 14 are arranged with their axes perpendicular. It will also be observed that the even numbered row and column address lines pass through the planes from the driver terminals to the terminating resistor in a direction opposite to the odd numbered row and column address lines. The cores and address lines of a conventional memory are often arranged in this manner for the reason that it simplifies the arrangement of the inhibit and sense windings. In the case where toroidal cores are employed and where single turn row, column, inhibit and sense windings are used, this arrangement permits the inhibit windings to be passed in one direction through one row of cores then back in the opposite direction through the next row, and so on in a like manner, while maintaining proper relationship with the row and column windings. An inhibit winding arranged in this manner is shown in the above mentioned copending application. The alternation of row and column address line directions is not essential to the present invention but it does offer certain constructional advantages, as will presently appear.

In accordance with the present invention, the interconnection of row and column windings of the several planes to provide address lines is such that the serially connected windings occupy different positions in each plane. The interconnections are provided in accordance with a general pattern whereby alternate address lines step one or more rows or columns in one direction in passing from one plane to the next while the remaining address lines step one or more rows or columns in the opposite direction. Consider, for example, the row address lines XX4 and XX5 which include the adjacent row windings X4 and X5 of plane 10. In accordance with the present invention, winding X4 of plane 10 is connected via a jumper 24 to winding X3 of plane 12 and via a jumper 26 to winding X2 of plane 14. Winding X5 of plane 10 is connected via a jumper 28 to winding X6 of plane 12 and via a jumper 30 to winding X7 of plane 14. Thus, the two address lines XX4 and XX5 which occupy adjacent rows in plane 10 are spaced three rows apart in plane 12 and five rows apart in plane 14.

A similar pattern is employed in interconnecting the column windings to provide column address lines. Two such lines YY4 and YY5 are shown in Figure 1. As shown, line YY4 includes winding Y4 of plane 10, jumper 32, Y3 of plane 12, jumper 34 and Y2 of plane 14. Line YY5 includes winding Y5 of plane 10, jumper 36, winding Y6 of plane 12, jumper 38 and winding Y7 of plane 14. The column address lines YY4 and YY5 diverge in the same manner as the row address lines XX4 and XX5.

Figure 2:
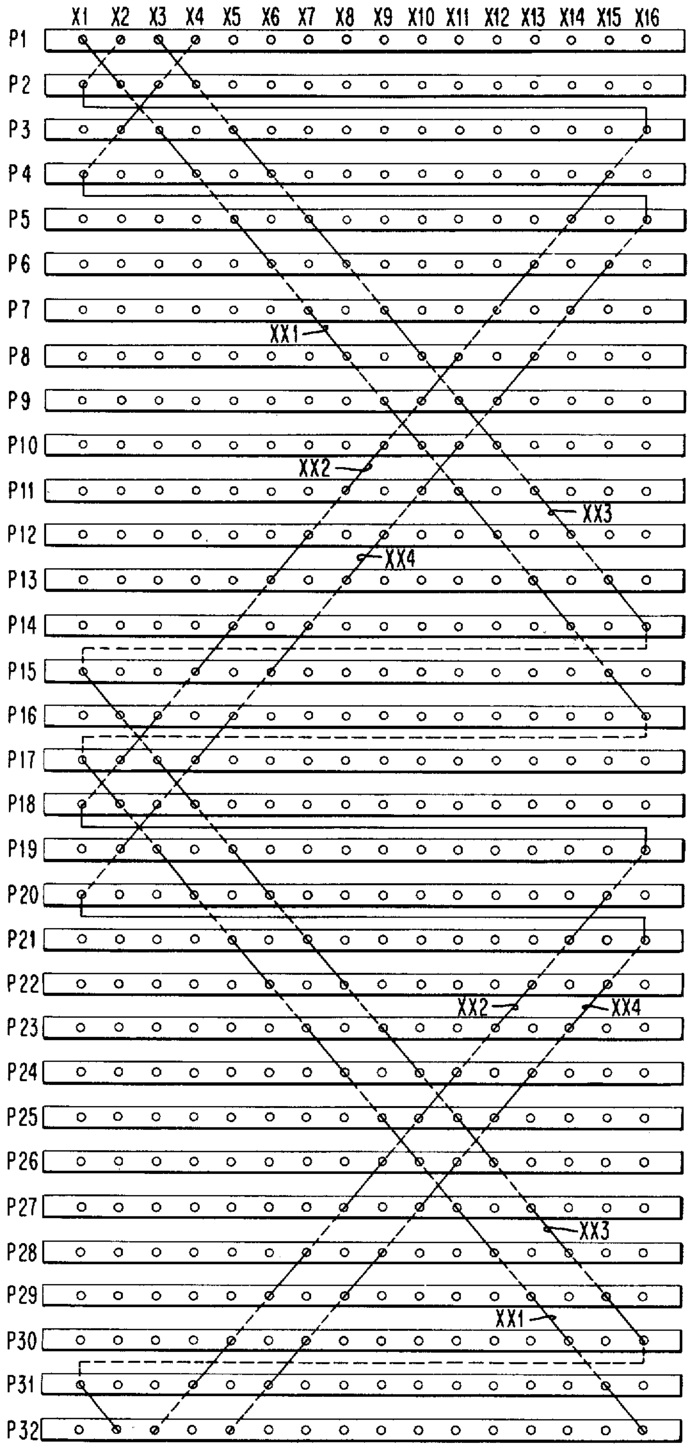
Figure 2 is a diagrammatic elevational view of a three dimensional memory array embodying the invention, illustrating the relationship of four address lines throughout the several planes.

In carrying out the pattern just described throughout an array of many planes, it is necessary to make provision for the case where an address line reaches the edgemost winding of a plane at some intermediate point in the array. Figure 2 illustrates an arrangement for handling such a case. In Figure 2 there is shown an elevational view of a three dimensional array which includes thirty two planes P1–P32, each of which comprises sixteen rows of cores. In the figure, the horizontal rectangles represent the planes, which may be considered as oriented perpendicular to the plane of the drawing and viewed from an edge. The dots within each rectangle represent the row windings, also oriented perpendicular to the plane of the drawing and viewed from one end. The dots in the uppermost rectangle are labeled X1–X16 to identify the row windings. The lines connecting dots from adjacent rectangles represent jumpers connecting the windings to form address lines. The solid lines indicate jumpers on the front side of the array and the dotted lines represent jumpers on the rear side of the array. An address line comprises a continuous succession of lines and dots. There are four such address lines shown and they are identified by the characters XX1, XX2, XX3, and XX4. It will be observed that each said address line comprises alternate dotted and solid jumpers, indicating that the address line is a series circuit of row windings.

Following an address line downwardly through the planes P1–P32, it will be seen that the odd numbered lines XX1 and XX3 step one row to the right in each successive plane while the even numbered address lines XX2 and XX4 step one row to the left. When an address line reaches the edgemost row winding of a plane, it is carried across the array to the edgemost row winding at the other end of the next lower plane and then continued in the same manner as before. For example, line XX2 commences with winding X2 of plane P1 and then steps to winding X1 of plane P2, the edgemost winding of that plane. To continue the line XX2, a long jumper is provided between winding X1 of plane P2 and winding X16 of plane P3. The same connection pattern is followed with lines XX1, XX3 and XX4 and with the other twelve row address lines not shown.

Figure 2 illustrates the substantial improvement in line-to-line noise reduction obtained with the present invention. Each of the lines XX1–XX4 is adjacent its neighboring address lines in no more than eight of the thirty two planes of the array, rather than in all thirty two planes as in the prior art devices. This means that line-to-line coupling is effectively reduced by a factor of four.

It will be observed from Figure 2 that address lines which are two winding positions apart (e.g. lines XX1 and XX3) are parallel to each other throughout the entire array. This condition may be altered and further noise reduction thereby obtained by employing a modified pattern as such that shown in Figure 3. This reduction is effected by "staggering" every other even numbered line and every other odd numbered line before they reach the edge of the array. The alternate even numbered lines and alternate odd numbered lines are connected in the manner shown in Figure 2. For example lines XX1 and XX4 are identical to those shown in Figure 2 while lines XX2 and XX3 are staggered. The staggering is accomplished by connecting the staggered address line in accordance with the basic pattern through five planes and then stepping back three rows between the fifth and sixth planes. Consider, for example, line XX3. This line starts with winding X3 of plane P1 and steps one row per plane to the right until it reaches winding X7 of plane P5. The jumper from plane P5 to plane P6, however, extends to the left three rows to couple winding X4 of plane 6. The same pattern is followed throughout the remaining planes.

Where a staggered line reaches the edge of a plane, it is jumpered back to the opposite edge of the next lower plane in the manner described with reference to Figure 2. This situation is illustrated by the connections of line XX2 at planes P2 and P3.

In the event that a step-back of three rows is called for and the winding is less than three rows from an edge of the array, the line is carried to the opposite side of the array and stepped back from that edge the required number of rows to make a total of three. The situation is illustrated by the connections of line XX2 at planes P5 and P6. Upon reaching winding X14 of plane 5, line XX2 must be stepped to the right three rows. Since only two rows exist between winding X14 and the edge of the array, the line is transferred to the left side and winding X1 of plane P6 is counted as the third row of the step-back.

From winding X1 of plane P6, line XX2 should step one row per plane to the left through five planes. However, since winding X1 is the edgemost winding a long jumper must be provided between winding X1 of plane P6 and winding X16 of plane P7 in accordance with the normal pattern where the edge of the array is reached.

Figure 3:
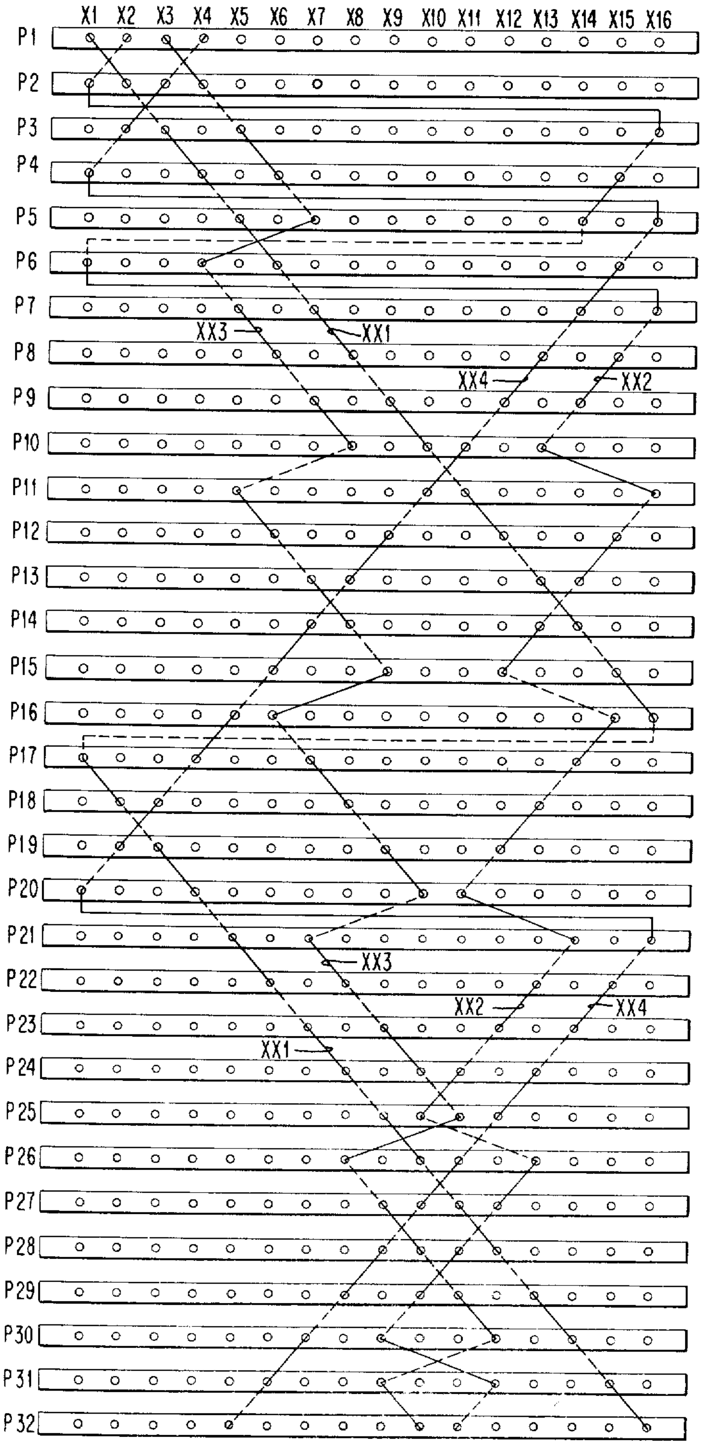
Figure 3 is a view similar to Figure 2 but showing a modified form of the invention.

Examination of Figure 3 will show that address lines which start at plane P1 with windings two winding positions apart are not parallel (i.e., equidistantly spaced) throughout the array as in Figure 2, due to the staggering of one of them. Consider, for example, lines XX1 and XX3. Line XX1 is connected in accordance with the basic pattern while line XX3 is staggered in the manner just described. Due to the staggering there is a general divergence between lines XX1 and XX3 through the first sixteen planes of the array, and a general convergence of these lines through the last sixteen planes. Alternate odd numbered lines and alternate even numbered lines, for example lines XX1 and XX5 (not shown), are still parallel or equidistantly spaced throughout the array, but they are no closer than four winding positions apart, and line-to-line coupling between them is low enough to be tolerated.

While Figures 2 and 3 show only two embodiments of the invention, other modifications of the basic pattern within the scope of the invention will be suggested to those skilled in the art. For example, the address lines may be wired vertically (as in the prior art) for several planes, then stepped in one direction or the other through one or more planes, then wired vertically through several planes again, etc. It should also be understood that while Figures 2 and 3 illustrate only the connections for row address lines, the invention contemplates the use of similar patterns for the column address lines. Moreover, since no interconnections exist between the row address lines and the column address lines, it is possible, if desired, to employ one pattern for the row address lines and a different pattern for the column address lines.

In Figures 1, 2 and 3, the invention has been shown and described with reference to a magnetic core array wherein adjacent row and column address lines extend through the planes in opposite directions. As will be hereinafter described with reference to Figure 5, this arrangement has the advantage that no jumpers which interconnect windings in adjacent planes need cross each other, except for the long jumpers which are employed to transfer an address line from one edge of the array to the other or to perform a step-back as shown in Figure 3. These jumpers are relatively few in number and may easily be insulated. It will be apparent that the invention is also applicable to arrays wherein all row and column address lines enter each plane from the same side and leave from the same side. In this arrangement, however, it is necessary to cross the jumpers for even and odd lines between adjacent planes and insulation of jumpers is required.

Figure 4:
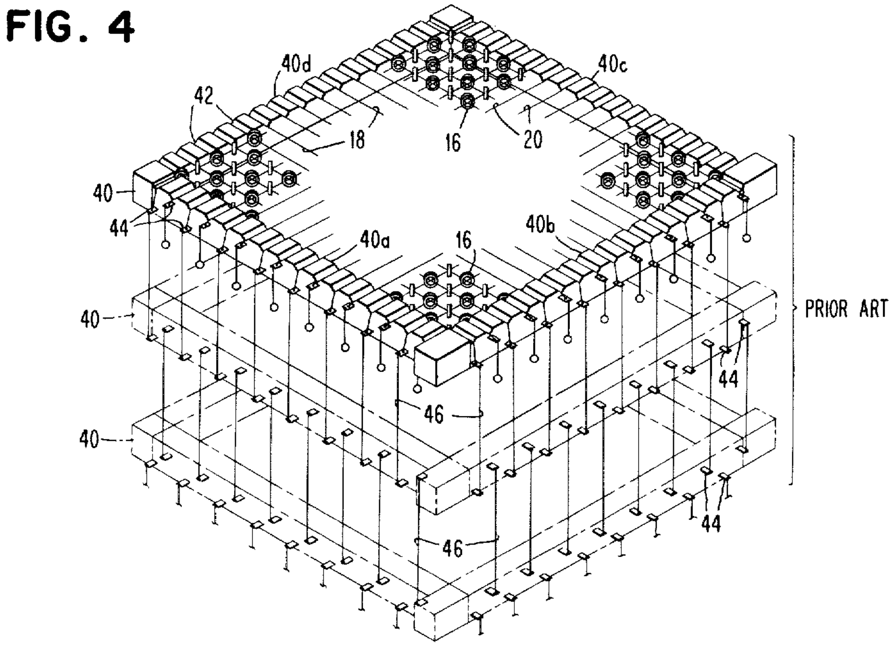
Figures 4 and 5 are elevational views of typical memory plane supporting frames, respectively illustrating address line interconnections made in accordance with prior art techniques and in accordance with the present invention.
Figure 5:
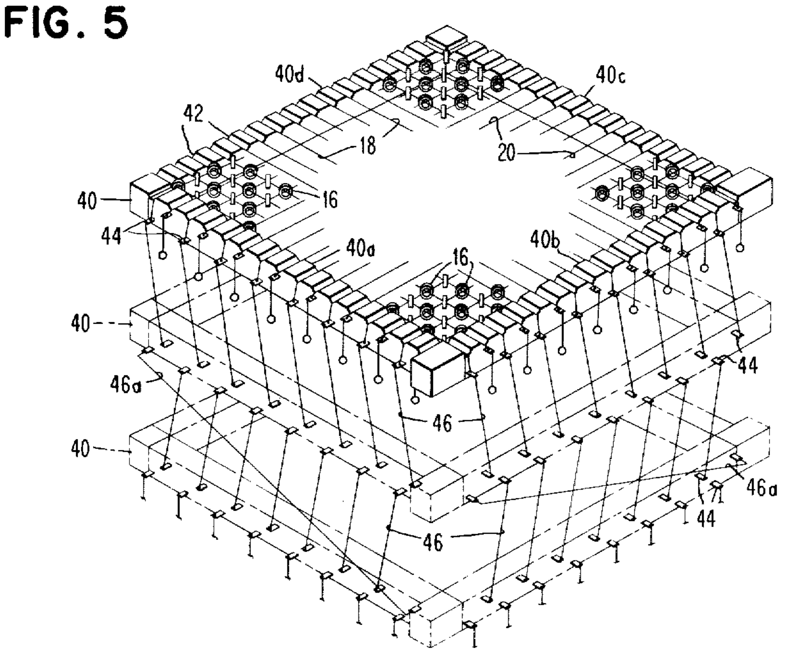

Referring now to Figures 4 and 5 of the drawings, there are shown two fragmentary perspective illustrations of magnetic core memory arrays, one wired in accordance with prior art teachings and the other wired in accordance with this invention. The core planes of the memory arrays are shown as supported by plane mounting frames 40 which are typical of those generally employed for this purpose. Each frame 40 comprises four side rails 40a, 40b, 40c and 40d joined to form an open rectangle wherein a plane of cores and windings is supported. The side rails 40a–40d have shallow grooves 42 in their upper faces extending from the inner edges to the outer edges. These grooves serve to support the row and column windings in proper spaced relation in the frame 40. On the outer edges of the side rails and in alignment with the grooves 42 are terminals 44. The relative size of the terminals compared with the distance between grooves requires that the terminals be staggered as shown in Figures 4 and 5. Alternate terminals are mounted near the upper edge of the side rails while those between are mounted near the lower edge. The terminals are normally staggered in such a way that corresponding terminals on opposite sides of a frame 40 are in different vertical positons, that is to say, a terminal near the upper edge at one side of the frame corresponds to a terminal near the lower edge on the opposite side.

The windings of the core plane mounted on a frame 40 are supported in the grooves 42 at opposite sides of the frame and are electrically connected at each end to the terminals 44. Interconnections between planes are made by connecting jumpers (usually in the form of bare wires) between selected terminals 44 of the frames. These jumpers are generally indicated by the reference character 46 in Figures 4 and 5.

Figure 4 illustrates the interconnection of several planes in accordance with the prior art teaching. As illustrated, the correspondingly positioned windings in each plane are connected in series by jumpers 46 which extend vertically betwen correspondingly located windings in adjacent frames. Since the address lines pass through the array in opposite directions, the jumpers between a given two frames 40 on any given side of the array connect only half of the terminals 44. Consider the first and second frames 40 of Figure 4. The lower terminals 44 on each side of the first, or top frame extend vertically downward to the correspondingly positioned terminals of the second frame 40. The upper terminals of the first frame 40 are connected to the address line drivers (not shown). The upper row of terminals 44 of the second frame 40 are connected by jumpers to the correspondingly located terminals in the third frame 40. This pattern is followed through the entire array. It will be observed in Figure 4 that with this construction, each jumper 46 extending between the second and third frames must pass between two of the lower terminals 44 of the second frame. This situation exists in alternate frames throughout the entire array. In arrays wherein substantial spacing between terminals can be tolerated, this interleaving of jumpers presents no serious problem. In high speed arrays, however, where compaction is necessary to reduce pulse propagation delay times, the promixity of adjacent terminals 44 on a frame 40 presents a serious danger of shorting if jumpers are interleaved.

A wiring pattern provided in accordance with the present invention obviates the necessity for interleaving jumpers in a memory array such as the one just described, and uses the staggered arrangement of the terminals 44 to advantage. It will be recalled that according to the present invention address lines move sidewise one winding position per plane as they pass through the array. Each jumper 46 extending between two frames 40 therefore connects between terminals 44 which are one row (or column) apart. Since terminals 44 one row apart occupy different vertical positions on their frames, this arrangement makes it possible to organize the address lines so that each leaves a frame 40 via a terminal 44 located near the lower edge of the frame and enters the next lower frame 40 via a terminal located near the upper edge of that frame. Figure 5 shows a memory array wired in this manner. All jumpers 46 interconnecting frames are coupled between a lower terminal 44 on one frame 40 and an upper terminal on the frame 40 below. No interleaving of jumpers is required. The jumpers are sloped in one direction or the other rather than positioned vertically, as in Figure 4, but since alternate lines pass through the array in opposite directions, nearly all jumpers between two frames on a given side of the array slope in the same direction and present no possibility of shorting. Only the long jumpers 46a which carry address lines from one edge of the array to the other cross other jumpers. These being few in number, may be insulated without undue inconvenience or expense.

It is believed evident from the foregoing description, read in connection with accompanying drawings, that the present invention offers a simple and economical solution to the problem of line-to-line coupling in a memory array, and also offers significant advantages in compaction and ease of construction of memory units. While the description has been directed to a magnetic core memory, it will be evident that the invention is applicable to any system wherein bistable elements are arranged in matrix fashion, and wherein a plurality of coordinate energizing or exciting means are employed.

While the invention has been particularly shown and described with reference to preferred embodiments thereof, it will be understood by those skilled in the art that various changes in form and details may be made therein without departing from the spirit and scope of the invention.

What is claimed is:

1. In a bistable element array, a plurality of separate groups of bistable elements, the elements in each group being arranged in rows, a plurality of separate row excitation means for each of said groups of elements, each separate row excitation means being coupled to all of the elements of a different row of elements in the associated group, and a plurality of conductors coupling said row excitation means of the several different groups in a plurality of circuits each of which circuits includes one row excitation means of each different group and any two of which circuits include adjacent excitation means in less than all of the groups of elements.

2. In a bistable element array which comprises a plurality of groups of bistable elements, each said group including a plurality of bistable elements arranged in rows and further including a plurality of separate row excitation means each of which is coupled to all of the elements of a different row of elements in the group, said groups being positioned to align the rows of elements in each group with corresponding rows in the other groups, the improvement in means for interconnecting the row excitation means of the several groups which comprises a plurality of electrical conductors coupling the row excitation means of the several groups in a plurality of separate series circuits each of which includes one row excitation means of each group, each said conductor coupling a single predetermined row excitation means of one group with a single row excitation means of an adjacent group other than the row excitation means of said adjacent group which is in alignment with the predetermined row excitation means in said one group.

3. In a magnetic element array, a plurality of separate groups of magnetic elements, the elements in each group being arranged in rows, a plurality of separate row coils for each said group of elements, each row coil being inductively coupled to all of the elements of a different row of elements in the associated group, and a plurality of conductors coupling said row coils of the several different groups in a plurality of circuits each of which circuits includes one row coil of each different group and any two of which circuits include adjacent row coils means in less than all of the different groups of elements.

4. In a magnetic core array which comprises a plurality of core planes, each said core plane including a plurality of magnetic cores arranged in rows and further including a plurality of separate row coils each of which is magnetically coupled to all of the cores of a different row of cores in the plane, said core planes being positioned to align the rows of cores in each plane with corresponding rows in the other planes, the improvement in means for interconnecting the row coils of the several planes which comprises a plurality of electrical conductors coupling the row coils of the several core planes in a plurality of separate series circuits each of which includes only one row coil of each core plane, each said conductor coupling a single predetermined row coil of one plane with a single row coil of an adjacent plane other than the row coil in said adjacent plane which is in alignment with the predetermined row coil in said one plane.

5. In a magnetic core array, a plurality of core planes, each said core plane including a plurality of magnetic cores arranged in rows and further including a plurality of separate row coils each of which is magnetically coupled to all of the cores of a different row of cores in the plane, and a plurality of separate row address lines, each said row address line including a single row coil of each different core plane, the row coils in adjacent planes which are included in the same address line occupying different positions within their respective planes.

6. In a magnetic core array having a plurality of core planes each including a group of cores arrayed in rows and columns, a separate row winding coupled to all of the cores in each row of each plane, and a separate column winding coupled to all of the cores in each column of each plane, first coupling means connecting the row windings of said core planes in a plurality of separate row address lines which pass through the entire array and each of which includes one row winding from each plane, second coupling means connecting the column windings of said core planes in a plurality of separate column address lines which pass through the entire array and each of which includes one column winding from each plane, said first coupling means being connected according to a general pattern in which row address lines which include adjacent row windings in a first of said planes are offset a predetermined number of rows in opposite directions in passing from certain of said planes to the adjacent planes.

7. The invention defined in claim 6 wherein said second coupling means are also connected according to said general pattern.

8. In a magnetic core array, a plurality of core planes each including a group of magnetic cores arranged in a plurality of rows, a plurality of row windings for each plane, each said row winding being inductively coupled to all of the cores of a different row in the associated plane, and a plurality of conductors each connecting one row winding of each plane except the last plane to one row winding of the adjacent plane, at least some of said conductors being offset to connect row windings which occupy non-corresponding positions in their respective planes.

9. The invention defined in claim 8 wherein all said conductors are offset to connect non-corresponding row windings.

10. The invention defined in claim 8 wherein certain of the conductors connected to adjacent windings in each plane are offset in opposite directions.

11. The invention defined in claim 8 wherein the non-corresponding row windings in adjacent planes that are connected to a common conductor are one row position apart.

12. In a magnetic core array, a plurality of core planes each including a group of magnetic cores arranged in a plurality of rows, a plurality of row windings for each plane, each said row winding being inductively coupled to all of the cores of a different row in the associated plane, means interconnecting said row windings to form a plurality of separate address lines each of which includes one row winding from each plane, said interconnecting means being connected in accordance with a pattern in which alternate address lines include alternate row windings in each plane and adjacent address lines include adjacent row windings in less than all planes.

13. In a magnetic core array, a plurality of parallel core planes each including a group of magnetic cores arrayed in at least a plurality of parallel rows, said core planes being vertically aligned to position corresponding rows of magnetic cores in vertical alignment, a separate row winding coupled to all of the cores in each row of each plane, and separate jumpers connecting each row winding of each plane except the lowermost plane in series with a row winding of the plane immediately therebelow to form row address lines each of which includes a row winding from each plane, certain of said jumpers being sloped to connect row windings which occupy non-corresponding positions in their respective planes, and more than half of the jumpers which connect windings in the same address line being sloped in the same direction.

14. The invention defined in claim 13 wherein each address line includes jumpers which are sloped in a direction opposite to said more than half of the jumpers.

15. The invention defined in claim 13 wherein said more than half of the jumpers of address lines which include adjacent row windings in the uppermost plane are sloped in opposite directions.

No references cited.